Figure 1:
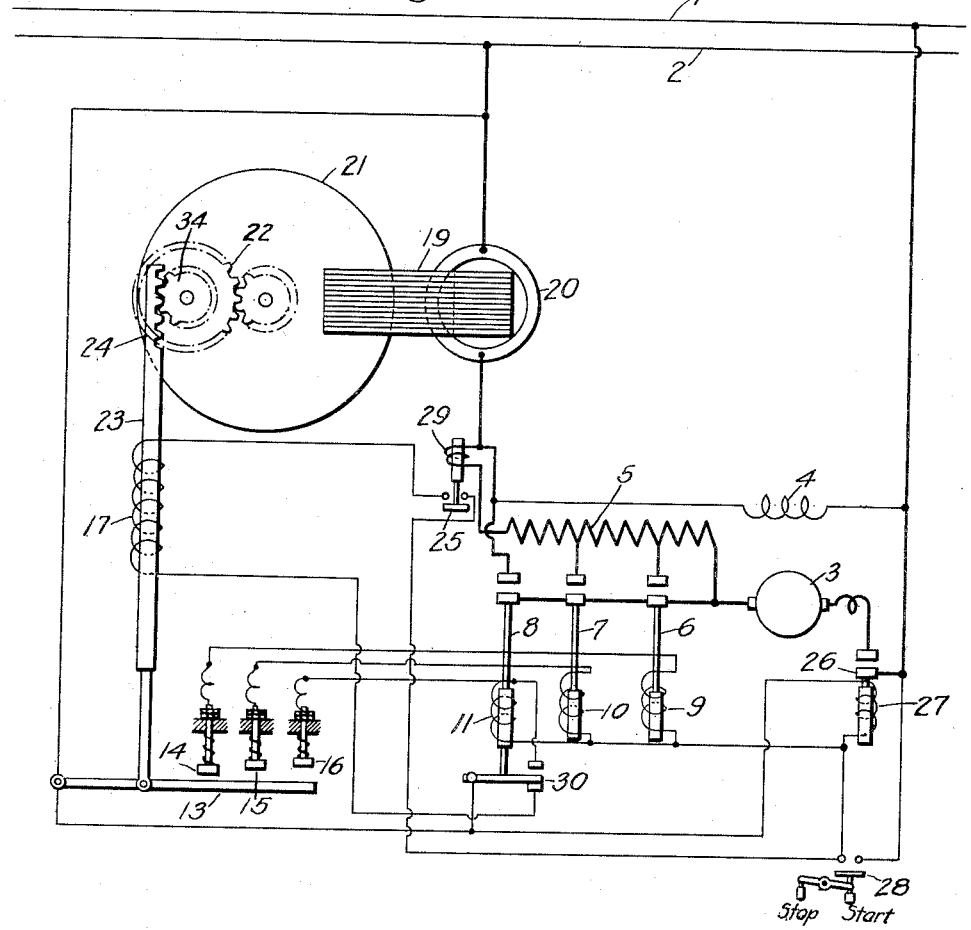

H. D. JAMES.
MOTOR CONTROL SYSTEM.
APPLICATION FILED JAN. 29, 1917.

1,370,019.

Patented Mar. 1, 1921.

2 SHEETS—SHEET 1.

WITNESSES:
Fred. C. Wilharm
J. R. Langley.

INVENTOR
Henry D. James
BY
Wesley G. Carr
ATTORNEY

H. D. JAMES.
MOTOR CONTROL SYSTEM.
APPLICATION FILED JAN. 29, 1917.

1,370,019.

Patented Mar. 1, 1921.
2 SHEETS—SHEET 2.

WITNESSES:
Fred. C. Wilharm
J. R. Langley.

INVENTOR
Henry D. James
BY
Wesley G. Carr
ATTORNEY

UNITED STATES PATENT OFFICE.

HENRY D. JAMES, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,370,019.    Specification of Letters Patent.    Patented Mar. 1, 1921.

Application filed January 29, 1917. Serial No. 145,228.

*To all whom it may concern:*

Be it known that I, HENRY D. JAMES, a citizen of the United States, and a resident of Edgewood Park, in the county of Allegheny and State of Pennsylvania, have invented a new and useful Improvement in Motor-Control Systems, of which the following is a specification.

My invention relates to control systems, and it has for its object to provide a simple and efficient means for controlling the rate at which electric motors are accelerated during starting.

When automatic devices are employed to effect the shunting of starting resistors for electric motors, it is desirable to provide time-element devices to limit or control the operation of the automatic devices in order that the motors may not be accelerated more rapidly than is consistent with safety. Heretofore, automatic starting devices have been controlled by dashpots or similar mechanisms which cause the starting devices to operate at substantially constant speeds. While the dashpot is usually adjustable in order that the speed of the starting device may be varied, such adjustment is made only before the starting device is in operation. The device operates, therefore, at a fixed rate of speed during each starting operation, the rate of such speed being determined by the adjustment of the time-element device.

It is well known that the conditions obtaining in the circuit of an electric motor may vary materially during the operation of starting. It is obvious, therefore, that a starting device which operates at substantially constant speed is not well adapted to control the motor circuits during the starting period.

Dashpots and other time-element devices embodying moving parts that are in frictional engagement possess the inherent defect that their operations are not uniform under substantially identical conditions. The forces exerted by such devices may vary considerably by reason of the presence of foreign substances, of variations in temperature and of the wearing or roughening of the engaging surfaces.

I provide an arrangement by means of which the rate of acceleration of an electric motor may be varied in accordance with the conditions obtaining in the motor circuit. The rate of acceleration is varied, moreover, to a degree that is proportional to the variations in effects produced by variations in the value of the current traversing the motor circuit.

It is well known that the amount of energy dissipated in the form of heat by an electrical circuit varies in accordance with the square of the value of the current traversing the circuit. Accordingly, the heating effects produced in an electric motor vary in the same proportion. The torque exerted by some types of motors varies in accordance with the square of the value of the current traversing their circuits.

In my improved arrangement, a substantially constant force operates to effect the successive closing of contact members or electromagnetic switches for controlling the starting resistor of an electric motor. The constant force is opposed by a varying force that is exerted by an electromagnet having an energizing coil in series with the motor. The movable member of the electromagnet comprises a disk which rotates through the magnetic field of the core member.

It is well known that the force exerted by a damping or retarding device of the character described above varies in accordance with the square of the value of the current traversing the energizing coil. It will be apparent, therefore, that the force tending to retard the operation of the accelerating device in connection with which it is employed varies in accordance with the square of the current traversing the motor circuit and, therefore, in accordance with the amount of energy dissipated in the form of heat by the motor windings and the torque exerted by the motor.

Figure 3:
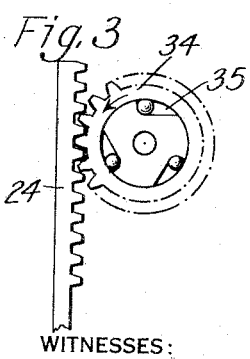
Figure 2:
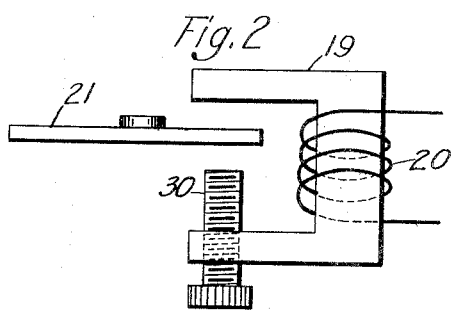
Figure 4:
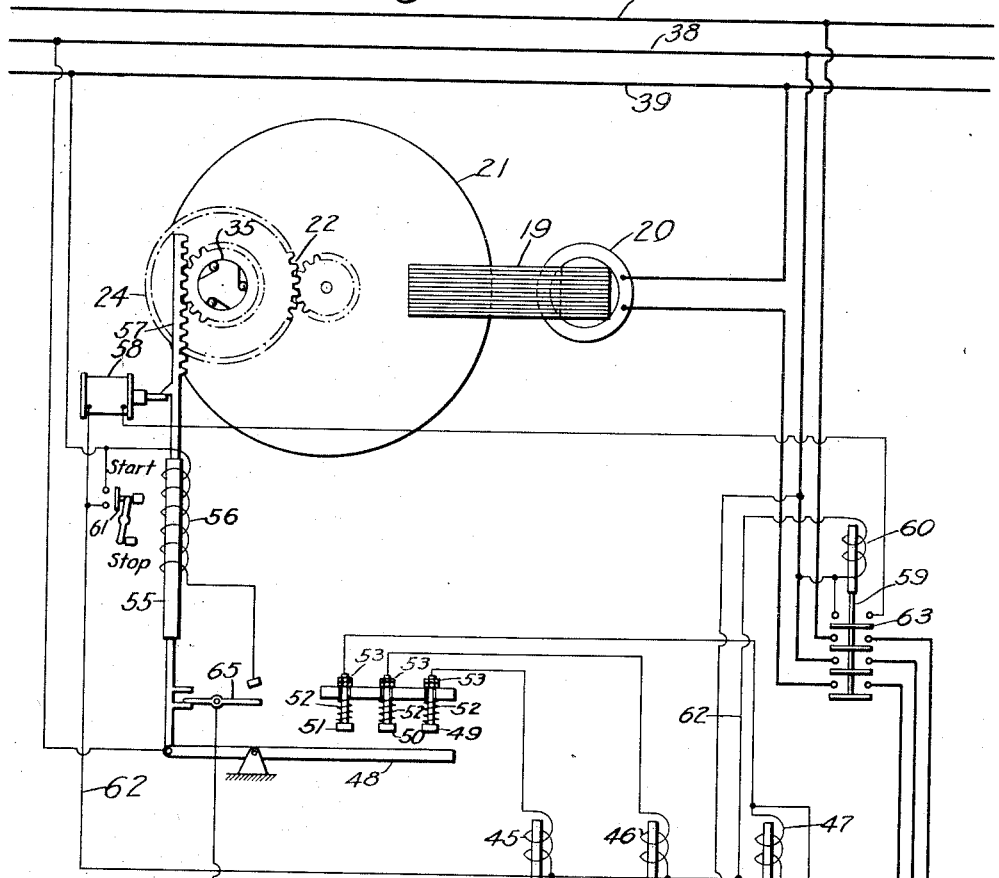
Figure 5:
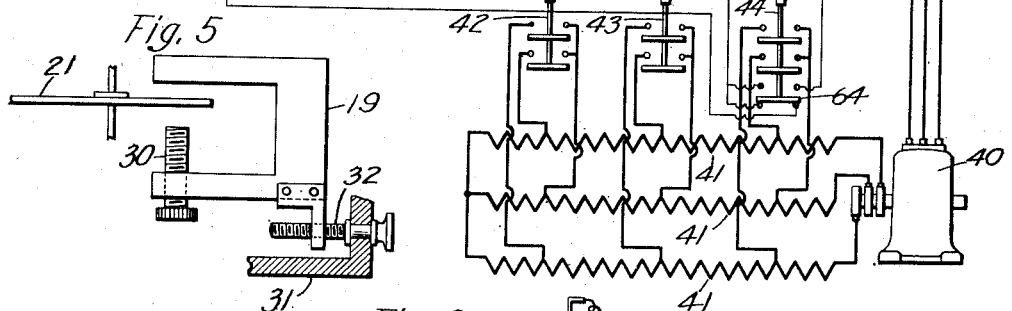
Figure 6:
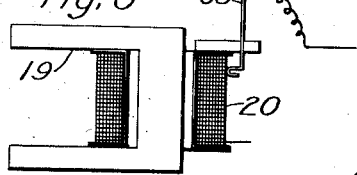

In the drawings, Figure 1 is a diagrammatic view of circuits and apparatus embodying my invention. Fig. 2 is a side view, in elevation, of the electromagnetic retarding device. Fig. 3 is a view showing the details of a portion of the gear mechanism. Fig. 4 is a diagrammatic view of circuits and apparatus embodying my invention as applied to alternating-current motors. Figs. 5 and 6 are views of portions of the electromagnet illustrating arrangements whereby its force may be adjusted.

Referring particularly to Fig. 1, line conductors 1 and 2, which may be connected to any suitable source of energy, supply current to an electric motor, the armature of which is indicated at 3 and which has a shunt field-magnet winding 4. A sectional starting resistor 5, which is in series-circuit relation to the armature 3, is controlled by electromagnetic switches 6, 7 and 8 that are respectively provided with actuating coils 9, 10 and 11.

The circuits of the coils 9, 10 and 11 are controlled by a movable contact arm 13 that is arranged to successively engage contact members 14, 15 and 16. The contact arm 13 is arranged to be actuated upwardly by a coil 17 and to be actuated downwardly by force of gravity. Since the force of gravity and the force exerted by the coil 17 are substantially constant, it is immaterial which of these forces is employed to effect the engagement of the contact arm with the several contact members.

The operation of the arm 13 is controlled by an electromagnetic retarding device which comprises a laminated core member 19, an energizing coil 20 that is in series-circuit relation to the armature 3, and a rotatable disk 21 of copper or other suitable conducting material. The disk 21 is operatively connected to the contact arm 13 by means of gear mechanism 22 and a link 23 that is provided with a rack portion 24. The link 23 constitutes a movable core member for the coil 17.

The circuit of the coil 17 is controlled by a series relay 25 which insures that the starting resistor cannot be shunted except upon the completion of the motor circuit through the entire resistor. This safety feature prevents the starting of the motor in case one or more of the starting-resistor grids is broken. This condition may occur in connection with cranes and charging machines which are subjected to severe shocks and vibrations. The operation of the automatic accelerating device would, under such circumstances, complete the motor circuit with only a portion, if any, of the starting resistor in circuit.

The motor circuit is controlled by a line switch 26 having an actuating coil 27. The circuits of the coils 17 and 27 are controlled by a manually operable switch 28 which may be of any suitable type. The switch 28 is illustrated in the form of a push button.

To start the motor, the switch 28 is closed to complete a circuit which extends from line conductor 1 through switch 28 and coil 27, to line conductor 2. The coil 27 is thereby energized to close line switch 26 to complete the motor circuit which comprises the starting resistor 5, actuating coil 29 of relay 25 and coil 20. A second circuit, which is also completed by the switch 28, extends from line conductor 1 through switch 28, coil 17 and a switch 30, that is mechanically connected to switch 8, to line conductor 2. The coil 17 is energized to actuate the contact arm 13 upwardly to successively engage contact members 14, 15 and 16.

The speed at which the contact arm 13 is actuated depends upon the retarding force exerted by the disk 21. This retarding force is, as has been previously explained, proportional to the square of the value of the current traversing the coil 20 and the armature winding 3. When the contact arm 13 engages contact member 14, the actuating coil 9 of switch 6 is closed to complete a shunt circuit for one section of the resistor 5 and thereby accelerate the motor. A rush of current traverses the motor circuit, and the retarding force exerted by the disk 21 is correspondingly increased.

The contact arm 13 engages the contact members 15 and 16 to complete the circuits of actuating coils 10 and 11 for the switches 7 and 8, respectively, and the latter close to complete shunt circuits for the corresponding sections of the resistor 5. The closing of switch 8 actuates switch 30 to its upper position to complete a holding circuit for actuating coil 11 and to open the circuit of coil 17. The arm 13 is permitted to return to its illustrated position by force of gravity. To stop the motor, it is only necessary to open the switch 28 and thereby deënergize the actuating coil 27 of line switch 26. The various parts then assume their respective illustrated or normal positions.

Reference may now be had to Fig. 2, in which a portion of the retarding device is illustrated. The core member 19 is provided with an adjusting screw 30, by means of which the reluctance of the magnetic circuit may be adjusted, as desired, to vary the retarding force exerted upon the disk 21. The rate at which the acceleration of the motor occurs may be adjusted in order to adapt the retarding device to the particular service in connection with which the motor is employed.

Other arrangements for adjusting the force exerted by the retarding device are shown in Figs. 5 and 6. In Fig. 5, the core member 19 is supported by a stationary member 31 and connected thereto by means of an adjustable screw 32. By means of this arrangement, the core member may be adjusted horizontally with respect to the disk 21 to thus vary the speed of the portion of the disk traversing the magnetic circuit of the magnet.

In the arrangement shown in Fig. 6, an adjustable connector 33 is provided for varying the number of turns of the coil 20. The strength of the magnetic field of the magnetic circuit comprising the core member 19 may thus be varied, as desired.

A portion of the gear mechanism 22 and of the rack 24 for coacting therewith is illustrated in Fig. 3. A pinion 34, which coacts with the rack 24, is connected to the remainder of the gear mechanism by a one-way clutch 35, of the roller type, in such manner that the link 23 may fall, by force of gravity, without actuating the disk 21. This arrangement insures that the movable arm 13 may be restored to its initial or "off" position without undue loss of time.

Reference may now be had to Fig. 4, in which is illustrated an adaptation of the system of Fig. 1 for controlling the acceleration of a three-phase alternating-current motor. Similar reference numerals are employed to designate parts corresponding to those of the system of Fig. 1. Line conductors 37, 38 and 39, which may be connected to any suitable source of alternating current, supply energy to a motor 40. Resistors 41 are connected, through the usual slip rings, to the secondary winding of the motor. The resistors 41 are controlled by a series of progressively operable electromagnetic switches 42, 43 and 44 having actuating coils 45, 46 and 47, respectively.

The circuits of the actuating coils 45, 46 and 47 are controlled by a movable contact arm 48 which coacts with contact members 49, 50 and 51. The contact members, which are yieldingly held in their respective illustrated positions by means of springs 52, are provided with nuts 53 in order that their initial positions may be adjusted to vary the lengths of the intervals occurring between their successive engagements by the contact arm 48.

The contact arm 48, which is pivotally mounted at an intermediate portion, is connected to a retarding device, similar in all material respects to that embodied in the system of Fig. 1, by means of a link 55 which constitutes the core member for a coil 56. The link 55 is adapted to be normally retained in its illustrated position by a latching mechanism 57 that is controlled by an electromagnet 58. The primary circuit of the motor is controlled by a line switch 59 having an actuating coil 60.

It may be assumed that the various parts occupy their respective illustrated positions. To start the motor, a push-button switch 61 is actuated to complete a circuit which extends from line conductor 39 through push-button switch 61, conductor 62 and coil 60 to line conductor 38. The coil 60 is energized to close line switch 59 and thereby complete the circuits of the primary windings of the motor.

The closing of switch 59 effects, also, the closing of a switch 63 mechanically connected thereto to complete a circuit for the coil of electromagnet 58 which extends from line conductor 39 through push-button switch 61, coil 58 and switch member 63 to line conductor 38. The latch member 57 is withdrawn to release the link 55 and the latter falls, by force of gravity, to actuate the contact arm 48 in a counter-clockwise direction about its point of pivotal support.

The arm 48 first engages contact member 49 to complete a circuit which extends from line conductor 38, through contact arm 48, contact member 49, coil 45, conductor 62 and push-button switch 61 to line conductor 39. The switch 42 is closed to complete a shunt circuit for a section of each of the resistors 41. The switches 43 and 44 are closed successively, in a similar manner, to complete shunt circuits for substantially the entire resistors 41.

The closing of switch 44 effects the closing of a switch member 64 mechanically connected thereto to complete a holding circuit for the coil 47 which extends from line conductor 39 through push-button switch 61, conductor 62, coil 47 and switch member 64, which is in its upper position, to line conductor 38.

When the link 55 and contact arm 48 have reached the limits of their respective paths of movement, a limit switch 65 is closed to partially complete a circuit for the coil 56. This circuit is open, however, at the pair of contact members bridged by the switch member 64 in its lower position. No further change in the positions of the various switches and operating parts occurs during the normal operation of the motor.

To stop the motor, it is only necessary to actuate the push-button switch 61 to open the circuit controlled by it. The circuits of the actuating coil 60 of line switch 59 and of actuating coils 45, 46 and 47 of the accelerating switches are opened and the corresponding switches fall to their open positions. The switch member 63 opens the circuit of coil 58 and the latch member 57 is permitted to assume its illustrated position.

The switch member 64 completes the circuit of coil 56 through limit switch 65, and the link 55 and contact arm 48 are actuated to their normal positions, as illustrated. As in the arrangement of Fig. 1, a roller clutch 35 permits the actuation of the controlling device to its normal position without actuation of the disk 21. The latch member 57 then engages the link 55, and the limit switch 65 is opened. The mechanism is then in position for the succeeding starting operation.

It will be noted that, in the arrangement just described, the contact arm for controlling the accelerating switches is actuated by force of gravity during the starting operation and is restored to its normal or inoperative position by electromagnetic means. The acceleration of the motor, however, occurs at a rate that is proportional to the square of the value of the current traversing the primary circuit of the motor, since the coil 20 is in series with one of the conductors for connecting the motor to the source of energy.

The acceleration of an electric motor by means of either of the arrangements described above occurs at a rate that is controlled by the value of the current traversing the motor. Since the rate of acceleration is proportional to the heating effects produced by the current traversing the circuit, there is no danger of damage to the motor because of an excessive current.

The rate of acceleration is proportional, also, to the torque exerted by the motor, and the motor operates accordingly to actuate the machine or device to which it is operatively connected without jerk or jar. This feature is particularly desirable when starting devices are employed in connection with elevators in order that the passengers may not experience jerks incident to sudden changes in the speed of the driving motors.

The retarding device operates with uniform force and effect under like conditions since it is entirely free from parts having frictional engagement. A starting device embodying a retarding device of this character is accordingly reliable and effective to control the rate of acceleration of an electric motor in accordance with the adjustment of the retarding device and the conditions obtaining in the motor circuit.

I claim as my invention:

1. In an electrical system, the combination with an electric motor, of means for accelerating said motor at a rate that is dependent upon the value of the current traversing said motor, said means comprising a plurality of contact members, a movable member, electromagnetic means for actuating said member to effect the successive operation of said contact members, and electromagnetic means comprising a coil in series with said motor for opposing the operation of said first-named electromagnetic means.

2. In a motor-control system, the combination with a motor having a resistor, of means for short-circuiting said resistor, means comprising an actuating coil for controlling said short-circuiting means, means for retarding the operation of said controlling means in one direction, means for permitting free actuation of said controlling means in the opposite direction and means for deënergizing said coil upon the short-circuiting of said resistor.

3. In a motor-control system, the combination with a motor having a resistor, of a switch for short-circuiting said resistor, a switch mechanically interlocked therewith, an actuating coil for said switches, a switch for closing the circuit of said coil and an actuating coil for said last-named switch, the circuit of said last-named coil including said mechanically interlocked switch when said short-circuiting switch occupies its inoperative position.

4. In a motor-control system the combination with a motor having a resistor, of a switch for short-circuiting said resistor, an actuating coil for said switch, means comprising an actuating coil for controlling the energization of said first coil, means initially in circuit with said motor for controlling the energization of said second-named coil and means for short-circuiting said last-named means upon the short-circuiting of said resistor.

5. In an electrical system, the combination with an electric motor and a source of energy therefor, of a resistor in circuit with said motor, means for connecting said motor to said source and means for preventing the operation of said connecting means if the electrical connection through said resistor is interrupted.

6. In an electrical system, the combination with an electric motor and a resistor in circuit therewith, of means for short-circuiting said resistor and means for preventing the completion of the motor circuit except through the entire resistor.

7. In an electrical system, the combination with an electric motor and a resistor in circuit therewith, of means for preventing the completion of the motor circuit except through the entire resistor, said means comprising accelerating means and a device controlled by current traversing a circuit comprising said resistor.

8. In an electrical system, the combination with an electric motor and a resistor in circuit therewith, of means for preventing the completion of the motor circuit except through the entire resistor, said means comprising accelerating means and a series relay for controlling said accelerating means.

9. In a motor-control system the combination with a motor having a resistor, a line switch and means for automatically shunting said resistor upon the closing of said switch, of means for preventing the operation of said shunting means when said resistor is broken.

10. In a motor-control system, the combination with a motor having a resistor and a plurality of switches for short-circuiting said resistor, of an actuating coil for each of said switches, a switch for closing the circuit of each of said coils, a member for closing said last-named switches successively, an actuating coil for said member, means in circuit with said motor for retarding the operative effect of said last-named coil, a switch mechanically interlocked with the last of said short-circuiting switches to close for controlling the circuit of said last-named coil when said mechanically interlocked switch occupies its normal position, said mechanically interlocked switch closing a holding circuit for the actuating coil of the last of said short-circuiting switches to close when said last of said short-circuiting switches is closed and means for thereupon permitting said member to be freely moved by gravity in the opposite direction.

11. In a motor-control system, the combination with a motor having a resistor and a source of energy for said motor, of a switch for connecting said motor to said source, a switch for shunting said resistor, means comprising an energizing coil and a member actuated thereby for effecting the closing of said shunting switch, means for retarding the operative effect of said first means in one direction, means for permitting free actuation of said first means in the opposite direction, a coil for said connecting switch, said coils being arranged in parallel circuit relation, and means for energizing said coils.

In testimony whereof I have hereunto subscribed my name this 20th day of January, 1917.

HENRY D. JAMES.